US006701207B1

(12) United States Patent
Gazzuolo

(10) Patent No.: US 6,701,207 B1
(45) Date of Patent: Mar. 2, 2004

(54) METHOD FOR INTEGRATING INFORMATION RELATING TO APPAREL FIT, APPAREL SIZING AND BODY FORM VARIANCE

(75) Inventor: Edith B. Gazzuolo, Crystal, MN (US)

(73) Assignee: Kinney & Lange, P.A., Minneapolis, MN (US)

( * ) Notice: Subject to any disclaimer, the term of this patent is extended or adjusted under 35 U.S.C. 154(b) by 175 days.

(21) Appl. No.: 10/008,851

(22) Filed: Nov. 2, 2001

Related U.S. Application Data
(60) Provisional application No. 60/245,411, filed on Nov. 2, 2000.

(51) Int. Cl.[7] .............................................. G06F 19/00
(52) U.S. Cl. ......................................... 700/132; 33/2 R
(58) Field of Search ................................ 700/130, 132; 702/167; 33/2 R, 3 R, 6, 17 R, 511, 512

(56) References Cited

U.S. PATENT DOCUMENTS

| | | | |
|---|---|---|---|
| 3,945,122 A | * 3/1976 | Durand et al. ............. 33/512 X |
| 4,261,012 A | 4/1981 | Maloomian ................... 358/93 |
| 4,467,349 A | 8/1984 | Maloomian ................... 358/93 |
| 4,486,774 A | 12/1984 | Maloomian ................... 358/93 |
| 4,539,585 A | 9/1985 | Spackova et al. ............. 358/93 |
| 4,546,434 A | 10/1985 | Gioello ........................ 364/300 |
| 4,598,376 A | 7/1986 | Burton et al. ................ 364/470 |
| 4,916,634 A | 4/1990 | Collins et al. ................ 364/513 |
| 5,163,006 A | 11/1992 | Deziel .......................... 364/470 |
| 5,163,007 A | 11/1992 | Slilaty ......................... 364/470 |
| 5,515,268 A | 5/1996 | Yoda ........................... 364/401 |
| 5,530,652 A | 6/1996 | Croyle et al. ................ 364/470 |
| 5,680,314 A | 10/1997 | Patterson et al. ....... 364/470.03 |
| 5,680,528 A | 10/1997 | Korszun ...................... 395/135 |
| 5,714,098 A | * 2/1998 | Potter ......................... 12/142 R |
| 5,724,522 A | 3/1998 | Kagami et al. .............. 395/226 |
| 5,768,135 A | * 6/1998 | Park ............................ 700/130 |
| 5,850,222 A | 12/1998 | Cone ........................... 345/418 |
| 5,930,769 A | 7/1999 | Rose ............................ 705/27 |
| 5,974,400 A | 10/1999 | Kagami et al. ............... 705/26 |
| 6,101,424 A | 8/2000 | Sawada ....................... 700/136 |
| 6,438,853 B1 | * 8/2002 | Gordon et al. ................ 33/2 R |

OTHER PUBLICATIONS

Star Tribune, Janet Moore, "An Online Fit to be Tried", Jul. 28, 2000, pp. D1–D2.
Consumer Reports, "Marketplace: The Shape of Clothes to Come", pp. 8,15.
Life, "Photographic Tailoring: New Method of Fitting Men's Clothes Successfully Employs Solid Geometry, A Special Camera and Nine Mirrors", Jan. 1948, pp. 71–72.
Edith Gazzuolo, "A Theoretical Framework for Describing Body Form Variation Relative to Pattern Shape: A Thesis Submitted to the Faculty of the Graduate School of Minnesota", Apr. 1985.

* cited by examiner

Primary Examiner—Peter Nerbun
(74) Attorney, Agent, or Firm—Kinney & Lange P.A.

(57) ABSTRACT

A method for integrating clothing fit information includes several steps. The first step is to define a multi-dimensional array having a plurality of cells. Each dimension of the multi-dimensional array represents a different one of a plurality of body measurements, and each cell of the multi-dimensional array represents a different body configuration. The second step of the method is to populate the plurality of cells of the multi-dimensional array with a fit data representative of corresponding body configurations. The third step is to query the multi-dimensional array for the fit data associated with at least one cell oft he multi-dimensional array.

22 Claims, 2 Drawing Sheets

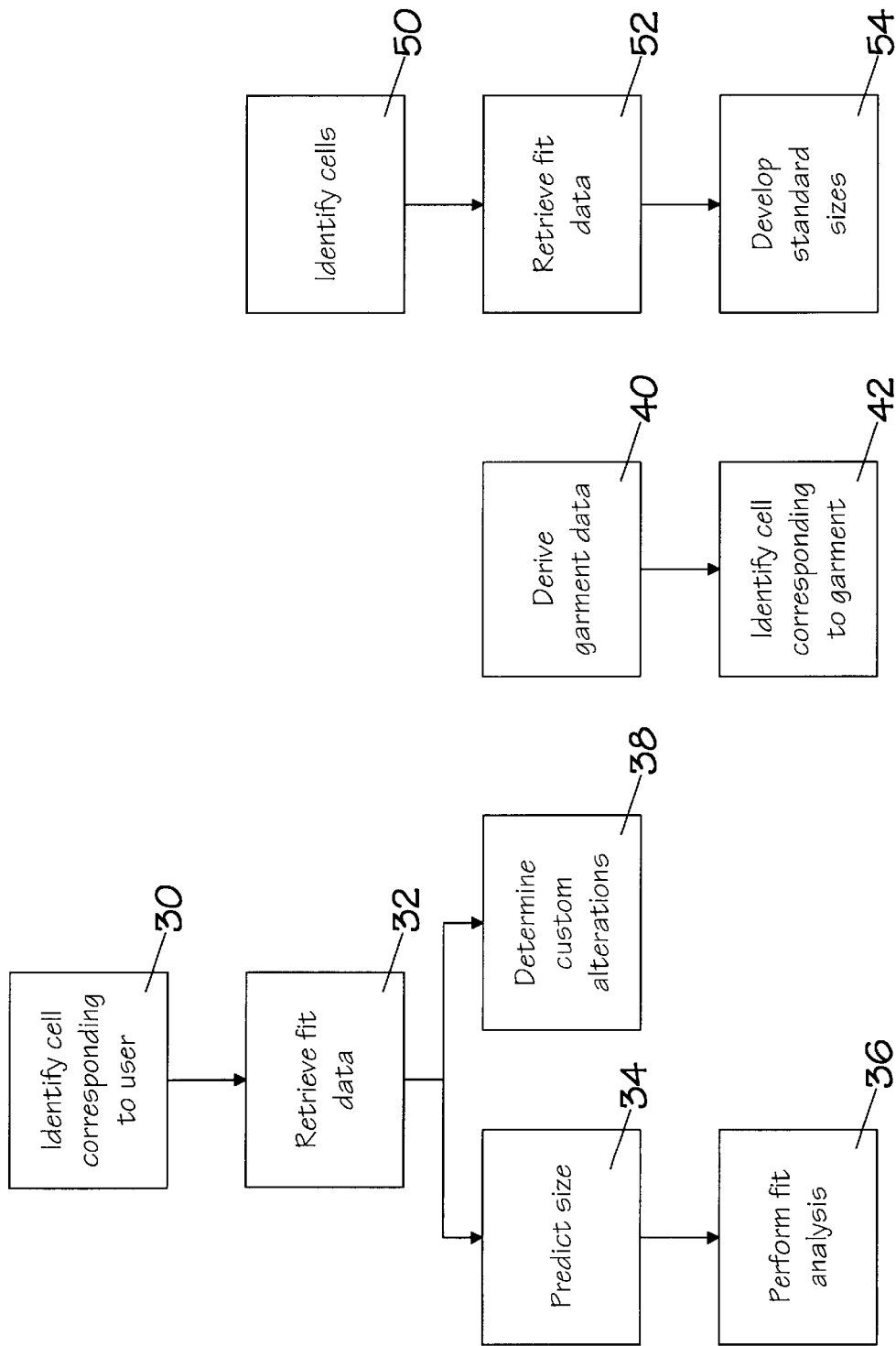

METHOD FOR INTEGRATING INFORMATION RELATING TO APPAREL FIT, APPAREL SIZING AND BODY FORM VARIANCE

CROSS-REFERENCE TO RELATED APPLICATION(S)

This application claims priority from provisional U.S. patent application Ser. No. 60/245,411, filed on Nov. 2, 2000 for "Virtual Fitting Room" of Edith B. Gazzuolo.

BACKGROUND OF THE INVENTION

The present invention relates generally to the field of data processing. In particular, the present invention relates to a method for generating and using a data structure for apparel size prediction, size analysis, size grading rule development, pattern generation and data mining.

For a given manufacturer, standard sizing of its line of garments begins with the selection of body dimensions that will represent its sample size. A human fit model is recruited by specifying this combination of measurements and then choosing from among the dimensionally-qualified applicants. Often these dimensions are basic circumferences, such as bust, waist and hip, with little if any regard for other critical variables such as lengths, shoulder width, posture, breast size, seat prominence, or the relationship of front to back dimensions.

The choice of fit model is often a matter of image or other intangible factors having little if any relationship to actual prevalence of specific body configurations within the manufacturer's target market. In fact, no current method exists for a manufacturer to determine the typical body configuration within its target market. The chosen fit model for the sample size then becomes the cornerstone for the manufacturer's entire line of garments. All sample garments are fitted and refined on this fit model to produce the sample size pattern. The sample size is then graded to all other sizes by adding or subtracting graduated amounts to each pattern point in length and width in order to produce the patterns for each size in the garment line.

Thus the individual characteristics of the fit model's specific body configuration are fitted and recorded in the cut of the sample size, and then reflected in every other size in the line through the grading process. Therefore, even when two different manufacturers seem to specify the same set of basic measurements, the actual fit and cut of their garments can be radically different. This is one reason individuals often exhibit brand loyalty to a specific manufacturer. Apparently the fit model chosen for their favorite brand has certain body configuration traits similar to their own. While body specifications vary among manufacturers, the major differences between them in garment cut and fit are more often in the details of its fit model's specific body configuration.

This variability of cut and fit in standard-sized garments is not necessarily a bad thing, since it enables individuals to gravitate toward brands cut closer to their own body configuration. What remains a major issue for both consumers and manufacturers, however, is the need to understand and specify these variables. Manufacturers have a need to understand the typical body configuration of their target market through the full range of sizes in order to produce standard-sized garments that fit the greatest proportion possible of their target group in every size. Individuals have a need to understand the optimal body configuration best fit by various brands in order to find those brands cut most closely to their own body configuration.

BRIEF SUMMARY OF THE INVENTION

A method for integrating clothing fit information includes several steps. The first step is to define a multi-dimensional array having a plurality of cells. Each dimension of the multi-dimensional array represents a different one of a plurality of body measurements, and each cell of the multi-dimensional array represents a different body configuration. The second step of the method is to populate the plurality of cells of the multi-dimensional array with a fit data representative of corresponding body configurations. The third step is to query the multi-dimensional array for the fit data associated with at least one cell oft he multi-dimensional array.

BRIEF DESCRIPTION OF THE DRAWINGS

FIG. 3 is a flow chart illustrating a method of implementing a query of the fit model matrix of the present invention.

FIG. 4 is a flow chart illustrating a method of implementing a query of the fit model matrix of the present invention.

FIG. 5 is a flow chart illustrating a method of implementing a query of the fit model matrix of the present invention.

DETAILED DESCRIPTION

Figure 1:
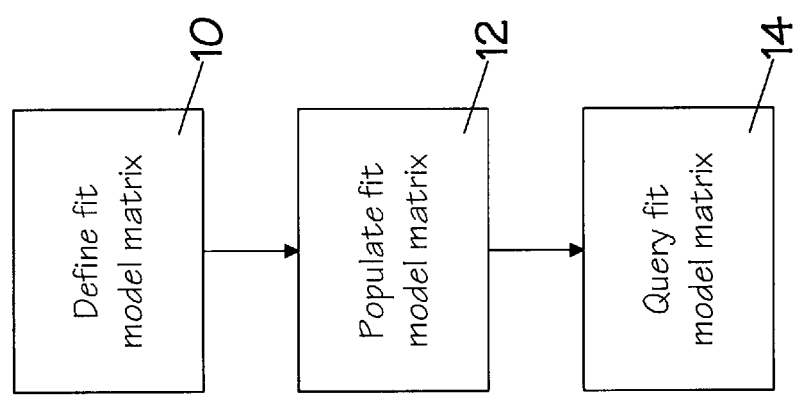
FIGS. 1 is a flow chart illustrating a method in accord with the present invention.

The present invention introduces a method for integrating information relating to apparel fit, apparel sizing and body form variance that can subsequently be used by both clothing consumers and manufacturers. FIG. 1 is a flow chart illustrating the method of the present invention. In accord with the present invention, a Fit Model Matrix is first formed. (Step 10). The Fit Model Matrix is a multi-dimensioned array containing upwards of 48 million cells. Each dimension, or axis, of the Fit Model Matrix represents a different body variable. The body variables represented in the Fit Model Matrix may include any or all of the thirty-nine (39) standard variables (such as bust, waist, high hip, hip and height) proposed by the American Society for Testing and Materials (ASTM) in its Standard D 5585. It is of course contemplated that the body variables represented in the Fit Model Matrix may also be different than those listed in ASTM Standard D 5585. Regarding implementation, the Fit Model Matrix may be implemented in computer code as a data structure.

The Fit Model Matrix is intended to overcome the insufficiencies of standard sizing formulas. Rather than assign sizes to a woman based upon the largest of her measurements, sizes are assigned to each part of her body individually. Thus, each cell of the Fit Model Matrix represents a different body configuration. For instance a person with a 25 inch waist and a 34 inch bust would be in a different cell than a person with a 26 inch waist and a 34 inch bust. With standard sizing practices, it is likely that both women would have been grouped together as "size 6s".

To simplify the Fit Model Matrix, standard sizes can be assigned to each body measurement included within the Fit Model Matrix, such that a particular cell may include persons having a "size 10" chest, a "size 12" bust, a "size 12" waist and a "size 10" hip, rather than a 34–35.5 inch chest, a 37–39 inch bust, a 28–30 inch waist and a 37.5–39–5 inch hip measurement. A simple size formula can then be assigned to each cell to allow easy access to the individual cell.

The next step of the present invention is to populate the Fit Model Matrix with fit data representative of a multitude of body configurations. (Step 12). The fit data may be varied depending on the system's requirements, but may include such data as anthropometric data, three-dimensional scan data, demographic information and common fit or sizing information and issues. The fit data may be derived from real persons, or it may be predicted based upon interpolation of real data and anthropometric survey results.

The third step of the present invention is to query the Fit Model Matrix for fit data associated with at least one cell of the Fit Model Matrix. (Step 14). The query can be used by a consumer to retrieve fit data from the Fit Model Matrix relevant for predicting her size in a particular garment, for performing a size analysis of how a particular garment will fit her, or for generating custom patterns for herself Manufacturers can also query the Fit Model Matrix to retrieve or identify the body forms of individuals that fit their clothing (potentially to compare the result to their target market) or to develop their standard sized garments to ensure that a majority of their target market can wear their clothing.

Figure 2:
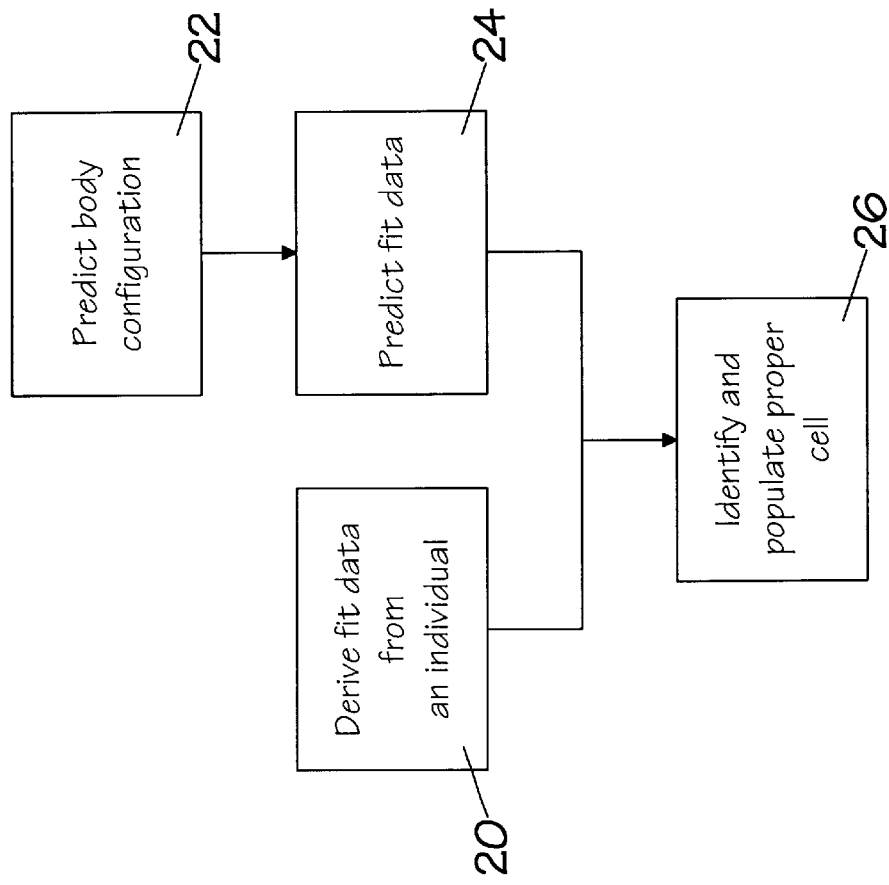
FIG. 2 is flow chart illustrating methods for populating a fit model matrix in accord with the present invention.

FIG. 2 is a flowchart illustrating methods for populating the Fit Model Matrix. As described in reference to FIG. 1, fit data may be derived from real persons, or it may be predicted based upon interpolation of real data and anthropometric survey results. This fit data may include three dimensional scan data representative of a surface geometry of the individual, as well as the individual's actual measurements, fit/size issues and demographic information.

Step 20 of FIG. 2 addresses the population of the Fit Model Matrix with fit data derived from actual individuals. The most reliable way to obtain accurate fit data from an individual is to perform a full body, three dimensional scan of the individual. To enable easier processing of the scan data, it can be converted into a body structure (or "body scan fit model") as disclosed in U.S. Pat. No. 6,546,309 of Edith B. Gazzuolo, entitled Virtual Fitting Room (which is hereby incorporated as though provided herein). Fit data can also be obtained from physical measurements of the individual, as well as from the individual's responses to a series of questions regarding fit of standard-sized garments. For instance, the individual may be ask whether the shoulders of "off-the-rack" clothing tends to be tight, about right or loose; whether the upper torso length tends to be long, about right, or short; whether the thigh tends to be tight, about right or loose; and so on. This type of data is particularly helpful in locating a proper cell for an individual.

Steps 22 and 24 of FIG. 2 address the population of the Fit Model Matrix with predicted fit data. The ability to predict fit data can be crucial to effective implementation of the Fit Model Matrix since it is often difficult to locate exact models of every possible body configuration.

Step 22 is to predict likely body configurations. In populating the Fit Model Matrix, it is not necessary to populate every cell in the matrix. Some cells of the Fit Model Matrix correspond to impossible body form configurations. For instance, it is most unlikely that an individual would have a "size 24" waist and a "size 4" hip. Thus, in minimizing the number of cells in the Fit Model Matrix, it is helpful to make predictions about the human form. For example, it could be predicted that a person's waist measurement will not stray more than four sizes from the hip measurement. By making such predictions, it is not necessary for the Fit Model Matrix to have cells representative of all combinations of the variables possible, but only of all combinations likely to occur in real people. Edith B. Gazzuolo's 1985 thesis entitled A Theoretical Framework for Describing Body Form Variation Relative to Pattern Shape: A Thesis Submitted to the faculty of the Graduate School of the University of Minnesota (hereby incorporated as if provided in full herein) provides information on making human form predictions that may simplify the Fit Model Matrix.

Once likely body configurations have been predicted, fit data may be predicted to further define the likely body configurations. (Step 24). Cells in the Fit Model Matrix not populated with data from real individuals may be populated with predicted data obtained from anthropometric survey results and/or from an interpolation of data representing real individuals.

The query of the Fit Model Matrix differs depending upon application. FIGS. 3–5 are each flow charts illustrating methods of implementing a query of the Fit Model Matrix for several illustrative applications.

The query illustrated in FIG. 3 enables an individual to obtain fit data, size prediction, fit analysis and custom alteration data from the Fit Model Matrix. In the first step, a cell of the Fit Model Matrix most closely corresponding to the individual is identified. (Step 30). Identification of the corresponding cell is a simple matter if the individual is one of the real persons modeled in the Fit Model Matrix. If, however, the individual has not been incorporated into the Fit Model Matrix, it is necessary to obtain information descriptive of the individual's body configuration. This information may include the individual's body measurements and/or the individual's responses to a series of questions concerning fit of standard sized garments. Once the individual's corresponding cell has been identified, fit data can be retrieved from the Fit Model Matrix. (Step 32). The retrieved fit data can then be used to determine a size of a selected garment that will best fit the individual. (Step 34). The retrieved fit data can also be used to perform a fit analysis of the garment in the determined size on the user. (Step 36). The steps of size determination and fit analysis are described in detail in U.S. Pat. No. 6,546,309. A third use of the retrieved data is for custom alteration of clothing patterns. (Step 38). The fit data can be analyzed to determine what alterations are necessary to modify a clothing pattern to custom fit the individual.

The query illustrated in FIG. 4 enables a clothing manufacturer to identify what body configurations best fit the manufacturer's garments. The first step is to analyze a selected size of a selected garment to derive garment data representative of the garment. (Step 40). The garment data can then be compared to the Fit Model Matrix to identify which cells represent a body configuration that best fits the garment. (Step 42). This query helps manufacturers identify whether the garments they are designing fit their target market of consumers.

The query illustrated in FIG. 5 enables a clothing manufacturer to develop standard-sized, "off-the-rack" garments that fit a best fit a majority of the manufacturer's target market or demographic group. First, cells of the Fit Model Matrix corresponding to consumers in the manufacturer's target market are identified. (Step 50). By searching the demographic information associated with each cell of the fit model matrix, a query for just those cells following within a certain demographic can be identified. Then, corresponding fit data is retrieved. (Step 52). With this fit data, the manufacturer can then design standard-sized garments that fit the target demographic. (Step 54). By grouping together similarly dimensioned individuals, sizes can be created that best fit the target market.

In conclusion, the Fit Model Matrix can be used as a filtering device for many different types of information relating to body configuration and garment style and sizing data. The present invention allows for disparate sets of data to be analyzed and compared by linking the disparate sets of data to specific body configurations.

Using the present invention, an existing line of garments in a full range of sizes can be studied and measured to determine the body configuration of the optimal body or range of bodies that best fit each size of the garment. Simultaneously, demographic information about the intended target market for each garment can be filtered through the Fit Model Matrix to determine the typical body configurations of the actual consumer group in all sizes.

Another scenario would allow an individual to determine her actual body configuration to then find the best fitting size in a particular garment. Moreover, because the Fit Model Matrix understands the differences between an individual's body and the optimal body or bodies which fit the garment, the Fit Model Matrix can generate a fit analysis of the garment in question, describing how the garment will fit all parts of the individual's body.

A third potential scenario involves mass customization, where an existing pattern has been analyzed to fit a specific body configuration or fit model. When the individual determines her specific fit model (or cell of the Fit Model Matrix), the two can be compared in all places indicating where pattern alterations are needed. Thus a custom pattern is automatically generated by the comparison and can be sent electronically to a single-ply cutter. In all three cases described above, disparate sets of data can be analyzed and compared because they have each been linked to a specific body configuration, which can then be compared to another specific body configuration.

The Fit Model Matrix of the present invention can also be used to handle the data associated with the virtual fitting room disclosed in U.S. Pat. No. 6,546,309.

The Fit Model Matrix of the present invention may be implemented in an Internet-type environment. With this implementation, access to the Fit Model Matrix is provided to both manufacturers and individuals over the Internet (or similar means). Manufacturers and individuals accessing the fit model matrix could then query the fit model matrix for specific requests as illustrated above.

Although the present invention has been described exclusive with reference to clothing, the present invention can also be used for product development of any object requiring anthropometric information which can be analyzed as described above, such as shoes, hats, helmets, gloves and face masks.

Although the present invention has been described with reference to preferred embodiments, workers skilled in the art will recognize that changes may be made in form and detail without departing from the spirit and scope of the invention.

What is claimed is:

1. A method for integrating clothing fit information, the method comprising:

defining a multi-dimensional array having a plurality of cells, each dimension of the multi-dimensional array representing a different one of a plurality of body variables and each cell of the multi-dimensional array representing a different body configuration;

populating selected cells of the multi-dimensional array with fit data, the fit data associated with each cell being representative of the corresponding body configuration;

querying the multi-dimensional array for the fit data associated with at least one individual and at least one garment; and comparing the queried fit data associated with the at least one individual to the queried fit data associated with the at least one garment.

2. The method of claim 1 wherein the plurality of body variables are selected from a plurality of measurements identified in American Society for Testing and Materials Standard D 5585.

3. The method of claim 1 wherein populating at least one of the plurality of cells of the multi-dimensional array with a fit data representative of corresponding body configurations comprises:

deriving from an individual a fit data representative of a body configuration of the individual;

identifying a cell of the multi-dimensional array that best corresponds to the individual's body configuration; and populating the identified cell with the fit data representative of the individual's body configuration.

4. The method of claim 1 wherein populating at least one of the plurality of cells of the multi-dimensional array with a fit data representative of corresponding body configurations comprises:

predicting a body configuration;

predicting from the predicted body configuration a fit data representative of the predicted body configuration;

identifying a cell of the multi-dimensional array that best corresponds to the predicted body configuration; and populating the identified cell with the fit data representative of the predicted body form.

5. The method of claim 4 wherein predicting a body configuration comprises:

predicting a body configuration based upon results of an anthropometric survey.

6. The method of claim 1 wherein the fit data is derived from a full body, three-dimensional scan data representative of a surface geometry of an individual's body.

7. The method of claim 1 wherein the fit data is derived from an anthropometric survey.

8. The method of claim 1 wherein the fit data comprises demographic information.

9. The method of claim 1 wherein querying the multi-dimensional array for the fit data associated with at least one individual comprises:

identifying one of the plurality of cells of the multi-dimensional array that best corresponds to a body configuration of the individual; and retrieving the fit data associated with the identified cell.

10. The method of claim 9 wherein identifying one of the plurality of cells of the multi-dimensional array that best corresponds to a body configuration of the individual comprises:

receiving from the individual information descriptive of the individual's body configuration.

11. The method of claim 10 wherein the received information comprises a plurality of body measurements.

12. The method of claim 10 wherein the received information comprises responses to a plurality of questions concerning fit of standard-sized garments.

13. The method of claim 1 wherein the multi-dimensional array is queried for fit data associated with one individual and at least one size of a garment, and wherein comparing the queried fit data associated with the at least one individual to the queried fit data associated with the at least one garment comprises:

determining from the queried fit data a size of the garment that will best fit the individual.

14. The method of claim 1 wherein the multi-dimensional array is queried for fit data associated with one individual and one garment, and wherein comparing the queried fit data associated with the at least one individual to the queried fit data associated with the at least one garment comprises:

determining from the queried fit data a fit analysis data representative of fit of the garment on the individual.

15. The method of claim 1 wherein the multi-dimensional array is queried for fit data associated with one individual and one garment, and wherein comparing the queried fit data associated with the at least one individual to the queried fit data associated with the at least one garment comprises:

determining from the queried fit data alterations necessary to modify the garment to custom fit the individual.

16. The method of claim 13 wherein the garment is a clothing pattern.

17. The method of claim 1 wherein querying the multi-dimensional array for the fit data associated with at least one garment comprises:

deriving from the at least one garment a garment data representative of the at least one garment; and identifying at least one of the plurality of cells representing at least one body configuration that bests fits the at least one garment.

18. The method of claim 1 wherein querying the multi-dimensional array for the fit data associated with at least one individual and at least one garment comprises:

identifying from the multi-dimensional array cells corresponding to a demographic group; and retrieving the fit data associated with the identified cells.

19. The method of claim 18 wherein comparing the queried fit data associated with at least one individual to the queried fit data associated with the at least one garment comprises:

determining from the queried fit data associated with the selected demographic group alternations necessary to modify the garment to best fit a subset of the selected demographic group.

20. A method for integrating anthropometric information, the method comprising:

defining a multi-dimensional array having a plurality of cells, each dimension of the multi-dimensional array representing a different one of a plurality of measurements and each cell of the multi-dimensional array representing a different configuration of a body part;

populating selected cells of the multi-dimensional array with corresponding anthropometric data;

identifying from the multi-dimensional array cells corresponding to a demographic group;

identifying from the multi-dimensional array at least one cell having anthropometric data representing a body part best fitted by a product; and comparing the anthropometric data associated with the cells corresponding to a demographic group to the anthropometric data representing a body part best fitted by a product.

21. The method of claim 20 and further comprising:

determining from the comparison of the anthropometric data associated with the cells corresponding to a demographic group to the anthropometric data representing a body part best fitted by a product alterations necessary to modify a product to best fit a subset of the demographic group.

22. The method of claim 21 wherein the product is selected from the group consisting of shoes, hats, helmets, gloves and face masks.

* * * * *

UNITED STATES PATENT AND TRADEMARK OFFICE
CERTIFICATE OF CORRECTION

PATENT NO. : 6,701,207 B1
DATED : March 2, 2004
INVENTOR(S) : Edith B. Gazzuolo

It is certified that error appears in the above-identified patent and that said Letters Patent is hereby corrected as shown below:

Title page,
Item [57], ABSTRACT,
Line 11, delete "oft he" insert -- of the --.

Column 2,
Line 13, delete "oft he", insert -- of the --.

Signed and Sealed this

Twenty-eighth Day of September, 2004

JON W. DUDAS
*Director of the United States Patent and Trademark Office*